United States Patent [19]

Kisanuki et al.

[11] Patent Number: 4,910,919
[45] Date of Patent: Mar. 27, 1990

[54] DOOR GLASS RUN FOR MOTOR VEHICLE

[75] Inventors: Hisayuki Kisanuki; Masahiro Nozaki, both of Ama, Japan

[73] Assignee: Toyoda Gosei Co., Ltd., Nishikasugai, Japan

[21] Appl. No.: 350,008

[22] Filed: May 9, 1989

[30] Foreign Application Priority Data

May 20, 1988 [JP] Japan .................................. 63-67120

[51] Int. Cl.$^4$ ............................................. E06B 7/16
[52] U.S. Cl. ....................................... 49/479; 49/441; 49/488
[58] Field of Search ........................... 49/479, 441, 488

[56] References Cited

U.S. PATENT DOCUMENTS

| | | | |
|---|---|---|---|
| 4,616,446 | 10/1986 | Okamoto | 49/479 X |
| 4,667,442 | 5/1987 | Hiramatsu et al. | 49/488 X |
| 4,704,820 | 11/1987 | Kisanuki | 49/441 |
| 4,756,944 | 7/1988 | Kisanuki | 428/122 |
| 4,769,947 | 9/1988 | Ogawa et al. | 49/479 |
| 4,785,584 | 11/1988 | Kisanuki et al. | 49/441 |
| 4,817,336 | 4/1989 | Kisanuki | 49/479 X |

Primary Examiner—Philip C. Kannan
Attorney, Agent, or Firm—Cushman, Darby & Cushman

[57] ABSTRACT

A door glass run to be attached along an inner periphery of a door frame of a motor vehicle, has a vertical member to be attached along a vertical portion of the door frame, an upper member to be attached along an upper portion of the door frame, and a corner member to connect an end of the vertical member to an end of the upper member and to be attached to a corner portion of the door frame. The door glass run has a seal lip which continuously extends along the door frame. The seal lip of the vertical member is directed inwards in the free state, and pushed outwards by the closed door glass. The seal lip of the corner member extends in the direction along the door glass, and comes into close contact with the closed door glass. The vicinity of the end of the vertical member is formed so that the cross section of the seal lip is gradually changed upwards from the cross section equal to that of the seal lip of the vertical member in the free state, to the cross section equal to that of the seal lip of the vertical member, which is in the state pushed outwards by the door glass, whereby when the door glass is fully closed, an end line of the seal lip of the door glass run extending along a vertical edge of the door glass becomes a continuous straight line throughout the whole length thereof, and accordingly, at that time, fine external appearance of the door glass run can be obtained.

4 Claims, 4 Drawing Sheets

DOOR GLASS RUN FOR MOTOR VEHICLE

BACKGROUND OF THE INVENTION

1. Field of the Invention

The present invention relates to a door glass run to be installed in a door of a motor vehicle for sealing around a fully closed door glass.

2. Description of the Prior Art

In an inner periphery of a door frame is installed a door glass run. This door run is composed of a vertical extruded member installed in a vertical portion of the door frame along a center pillar of a vehicle body, an upper extruded member installed in an upper portion of the door frame along a roof side, and a molded member having a form of a corner for connecting the vertical and upper extruded members to each other.

The vertical extruded member has a cross section of a nearly U-shape, and is provided with seal lips in the respective opposed opening ends. This vertical extruded member guides a vertical edge of a door glass for closing or opening purpose. The upper extruded member has a tubular shape, and is pushed up by an upper edge of the door glass when being fully closed. The molded corner member has a cross section changing from the cross section equal to that of the vertical extruded member to the cross section equal to that of the upper extruded member.

FIG. 7 illustrates the connecting portion of the vertical extruded member 3A and the upper extruded member 3B.

An end line 331 of an outside seal lip 33 of the molded corner member 3C, which is to be into contact with an outer surface of a door glass 2, forms a straight line with each of an end line 311 of an outside seal lip 31 of the vertical extruded member 3A, and an end line 321 of an outside seal lip 32 of the upper extruded member 3B.

When the door glass 2 is guided by the door glass run having the above described construction for fully closing, the outside seal lip 33 of the corner member 3C is liable to generate wrinkles along an end line thereof. This results in fine external appearance of the corner member 3C being not maintained.

The wrinkles of the corner member 3C are generated for the following reason:

The end of the outside seal lip 31 of the vertical extruded member 3A in the free state positions inside of the outer surface of the door glass 2. When the door glass 2 is closed, the end of the seal lip 31 is pushed outwards by the outer surface of the door glass 2. On the other hand, the end of the outside seal lip 32 of the upper extruded member 3B in the free state positions outside of the outer surface of the door glass 2. When the door glass 2 is closed, a tubular sealing portion 36 is pushed up and the seal lip 32 is drawn inwards to be come into contact with the outer surface of the door glass 2.

This results in, as shown in FIG. 8, the end line 331 of the outside seal lip 33 of the molded corner member 3C in the free state forming an S-shaped curve line from the vertical extruded member side (lower side in FIG. 8) to the horizontal upper extruded member side (upper side in FIG. 8). When the door glass 2 is closed, the end line 331 is shifted to a straight line 331' extending along the outer surface of the door glass 2 in close contact therewith to generate wrinkles in the seal lip 33 of the molded corner member 3C.

In order to prevent the corner member 3C from generating wrinkles, there has been adopted such a measure as to direct the end of the outside seal lip 33 of the corner member 3C to the direction along the outer surface of the door glass 2, and increase the wall thickness of the end of the outside seal lip 33 as compared with the end of the outside seal lip 31 of the vertical extruded member 3A as shown in FIG. 9 so as to give it such rigidity as not to be deformed when the door glass is closed.

However, the door glass run to which the above described measure is applied, has the following problem:

When the door glass 2 is fully closed and the outside seal lip 31 is outwards pushed by the door glass 2, the end line of the outside seal lip 31 of the vertical extruded member 3A is shifted toward the middle of the door glass 2 from the solid line 311 to a broken line 311' as shown in FIG. 7 On the other hand, the end line 331 of the molded corner member 3C is not shifted even after the door glass is closed. This results in the end line 331 forming a concave line with respect to the end line 311'.

As described above, the end line of the seal lip of the door glass run extending along a vertical edge of the door glass does not become staight in its upper portion so as to worsen the external appearance of the door glass run in the closed state of the door glass.

SUMMARY OF THE INVENTION

It is an object of the present invention to provide a door glass run having improved external appearance, wherein an end line of a seal lip to be come in contact with an outer surface of a vertical edge of a door glass forms a straight line from a vertical portion to a corner portion in the closed state of the door glass.

According to the present invention, a door glass run has a vertical member to be attached along a vertical portion of the door frame, an upper member to be attached along an upper portion of the door frame, and a corner member to be connected to an end of the vertical member and an end of the upper member and attached to a corner portion of the door frame. The vertical member has a U-shaped cross section and is provided with a seal lip to be come into contact with a vertical edge of an outer surface of the door glass. The seal lip of the vertical member is directed inwards in a free state, and is pushed outwards by the vertical edge of the door glass so that a vertically extending end line of the seal lip is shifted toward a middle of the door glass along the outer surface thereof at the time the door glass is closed.

The upper member is provided with a tubular portion and a seal lip to be come into contact with an upper edge of the outer surface of the door glass, and the tubular portion is pushed up by the upper edge of the door glass at the time the door glass is fully closed.

The corner member is provided with a seal lip to be come into contact with a corner edge of the outer surface of the door glass. The seal lip of the corner member extends in substantially the same direction as the extending direction of the outer surface of the door glass and comes into contact with the outer surface of the door glass at the time the door glass is fully closed. The vertically extending end line of the seal lip of the corner member forms a straight line coinciding with an end line of the seal lip of the vertical member, which is in the state pushed outwards by the outer surface of the door glass, at the time the door glass is fully closed.

The seal lip of a connecting portion of the vertical member and the corner member has a cross section gradually changing from that of the seal lip of the vertical member in the free state, to that of the seal lip of the corner member.

BRIEF EXPLANATION OF THE DRAWINGS

FIG. 1 is a front view of a door of a motor vehicle provided with a door glass run;

FIG. 2 is a detail view of a corner portion of a door frame;

FIG. 3 is a cross sectional view taken along the line III—III of FIG. 2;

FIG. 4 is a cross sectional view taken along the line IV—IV of FIG. 2;

FIG. 5 is a front view of the corner portion of the door glass run;

FIG. 7 is a front view of a corner portion;

FIG. 8 is a view illustrating the deformation of an end of a seal lip of a corner portion of the door glass run; and FIG. 9 is a cross sectional view of the portion corresponding to that shown in FIG. 3.

DETAILED DESCRIPTION OF THE EMBODIMENTS

FIGS. 1 through 5 illustrate a first embodiment of a door glass run according to the present invention.

Figure 1:
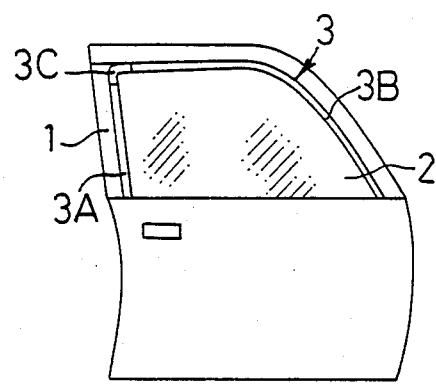
FIGS. 1 through 5 illustrate a first embodiment of a door glass run according to the present invention.
Figure 2:
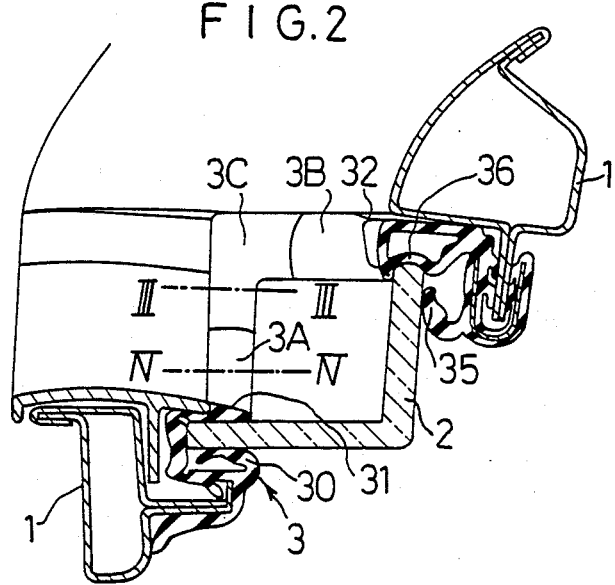

As shown in FIGS. 1 and 2, a door glass run 3 is attached along an inner periphery of a door frame 1. The door glass run 3 is composed of an vertical extruded member 3A attached along a vertical portion of the door frame 1, an upper extruded member 3B attached along an upper portion of the door frame 1, and a molded corner portion 3C connecting the vertical extruded member 3A to the upper extruded member 3B. As shown in FIGS. 2 thorugh 5, the vertical extruded member 3A has a nearly U-shaped cross section, and is provided with seal lips 30, 31 in its opening end.

When a door glass 2 is elevated, the door glass 2 is guided by the vertical extruded member 3A with a vertical edge sandwiched between the seal lips 30, 31. The opening end of the vertical extruded member 3A is made narrow, and the outside seal lip 31 is directed inwards as shown by a broken line in FIG. 4. When the door glass 2 is closed, the outside seal lip 31 is pushed outwards by an outer surface of the door glass 2. At this time, the end line 311 of the seal lip 31 is shifted along the outer surface of the door glass 2 to the position shown by a broken line 311'.

On the other hand, the upper extruded member 3B is provided with an outside seal lip 32 and an inside seal lip 35 on both sides of a tubular sealing portion 36. When the door glass 2 is fully closed, the sealing portion 36 is pushed up by an upper edge of the door glass 2, and the outside seal lip 32 is drawn inwards to come into pressure contact with the outer surface of the door glass 2. At this time, the end line 321 of the outside seal lip 32 is shifted toward the middle of the door glass 2 along the outer surface thereof. However, this shift is very small as compared with that of the seal lip 31 of the vertical extruded member 3A.

Figure 3:
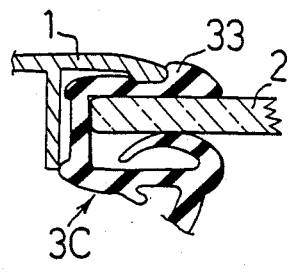

An end of a horizontal portion of the corner member 3C has a cross section nearly equal to that of the upper extruded member 3B, and is connected to the upper extruded member 3B. An end of a vertical portion of the corner member 3C has a cross section equal to that of the vertical extruded member 3A of which the seal lip 31 is in the state pushed outwards by the door glass 2. And an upper part of the vertical portion of the corner member 3C has a cross section that the seal lip 33 extends in a direction along the outer surface of the fully closed door glass, and has a wall thickness larger than that of the seal lip 31 of the vertical extruded member 3A as shown in FIG. 3. This cross section of the upper part of the vertical portion of the corner member 3C is gradually changed downward to the above described cross section of the end thereof. The end line 331 of the seal lip 31 of the vertical portion of the corner member 3 C forms a straight line with the end line 311' of the seal lip 31 of the vertical extruded member 3A, which is in the state pushed up by the door glass 2.

An upper end of the vertical extruded member 3A has a cross section equal to that in the state that the seal lip 31 is pushed outwards by the door glass 2, that is equal to that of the end of the vertical portion of the corner member 3C, thereby being continuously connected to the end of the vertial portion of the corner member 3C.

Figure 5:
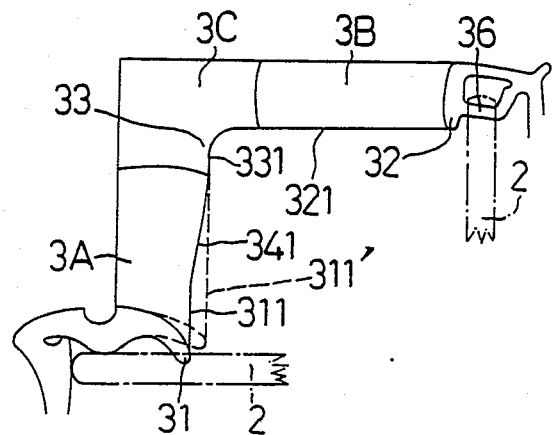

In the vicinity of the end of the vertical extruded member 3A, the seal lip thereof has a cross section gradually changing upwards from the free stated cross section directed inwards with respect to the outer surface of the door glass 2, to the cross section in the state pushed outwards by the door glass 2. In this portion, the end line 341 of the seal lip 31 forms an inclined line with respect to the lines 311, 331 as shown in FIG. 5.

The vertical extruded member 3A and the upper extruded member 3B are connected to each other by the following method: The vertical extruded member 3A and the upper extruded member 3B which are respectively formed by extruding a rubber material, are set in a cavity of a metal mold so that ends thereof are perpendicularly opposed to each other through a predetermined space. Then, a rubber material is poured into the cavity, and this rubber material is molded to form the corner member 3C. In this case, the vertical extruded member 3A is set within the metal mold so that the shape of the seal lip 31 is gradually changed in the vicinity of the end thereof, and then is thermally molded within the metal mold.

The thus obtained door glass run is attached to the door frame. In the case that the door glass 2 is not elevated, the end line of the seal lips 31 and 33, each extending along the vertical portion of the door frame 1 is composed of vertically extending straight lines 311 and 331 which are offset with respect to each other, and an inclined line 341 connecting the lines 311, 331. In the case that the door glass 2 is elevated for fully closing, the seal lip 31 is pushed outwards by the door glass 2 to cause the end line 311 to be shifted to the position of the line 311', and also cause the inclined line 341 to be shifted to the position coinciding with the line 311'.

On the other hand, the end line 331 of the seal lip 33 of the corner member 3C is previously formed straight so as to coincide with the line 311'. Therefore, the lines 311' and 331 form a continuous vertical straight line to provide a straight end line of the seal lip in the vertical portion of the door glass run with fine external appearance free from such wrinkles as being encountered by the conventional door glass run.

Figure 6:
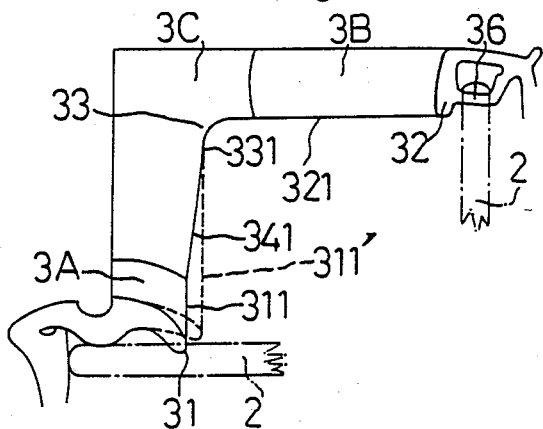
FIG. 6 is a view illustrating the corner portion of a second embodiment of a door glass run according to the present invention.
Figure 7:
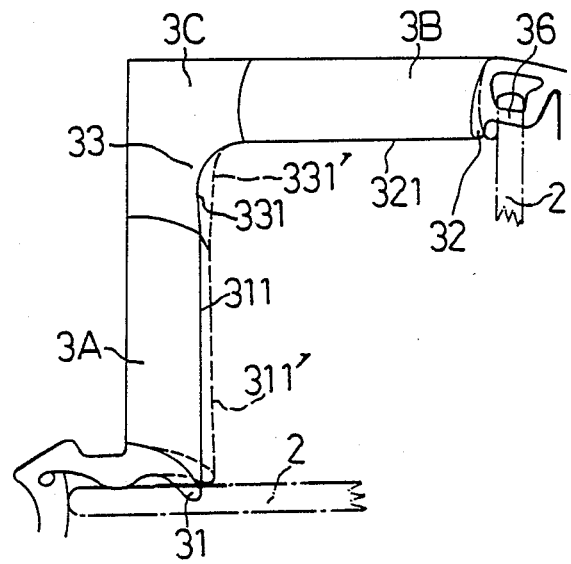
FIGS. 7 through 9 are views illustrating a conventional door glass run, respectively.
Figure 8:
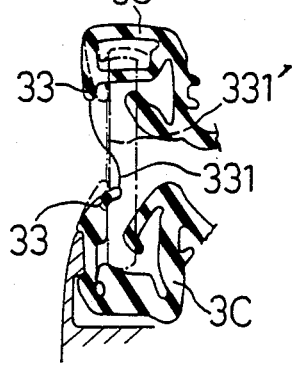
Figure 9:
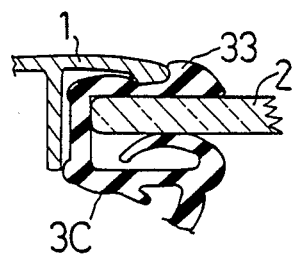

FIG. 6 illustrates a second embodiment of a door glass run according to the present invention. Hereinafter, the difference between the second embodiment and the first embodiment will be mainly explained.

Figure 4:
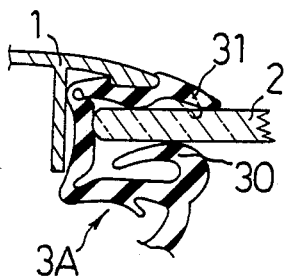

The vertical extruded member 3A has the cross section as shown in FIG. 4, which is not changed throughout the whole portion thereof including the end to which the corner member 3C is connected. The vertical portion of the corner member 3C is formed longer than that of the first embodiment. A lower end of the corner member 3C has a cross section equal to that of the vertical extruded member 3A as shown by a broken line in FIG. 4. And the cross section of the lower part of the corner member 3C is gradually changed upward to the cross section equal to that of the vertical extruded member of which the sseal lip is in the state pushed outwards by the door glass. Then, the cross section of the corner member 3C is gradually changed upward to that as shown in FIG. 3. This results in the end line of the seal lip extending along the vertical portion of the door frame 1 becoming a line composed of vertically extending straight lines 311, 331 which are offset with respect to each other, and an inclined line 341 connecting the lines 311, 331, similarly to the first embodiment. And these lines form a vertically extending continuous straight line when the door glass is fully closed.

In the door glass run according to the present invention, wrinkles are not generated in the seal lip of the corner member in the state that the door glass is closed, and in this state, the end lines of the seal lips extending along both the vertical portion and the horizontal upper portion become a continuous straight line free from irregularity, respectively.

What is claimed is:

1. A door glass run to be attached along an inner periphery of a door frame of a motor vehicle for sealing an edge of a door glass at the time the door glass is closed, comprising:

a vertical member to be attached along a vertical portion of the door frame; said vertical member having a U-shaped cross section and being provided with a seal lip to come into contact with a vertical edge of an outer surface of the door glass; said seal lip being directed inwards in a free state, and being pushed outwards by the vertical edge of the door glass so that a vertically extending end line of said seal lip is shifted toward a middle of the door glass along the outer surface of the door at the time the door glass is closed;

an upper member to be attached along an upper portion of the door frame; said upper member being provided with a tubular portion and a seal lip to come into contact with an upper edge of the outer surface of the door glass, and said tubular portion being pushed up by the upper edge of the door glass at the time said door glass is fully closed;

a corner member connecting an end of said vertical member to an end of said upper member, and to be attached to a corner portion of the door frame; said corner member being provided with a seal lip to come into contact with a corner edge of the outer surface of the door glass; said seal lip of said corner member extending in substantially the same direction as the extending direction of the outer surface of the door glass, and coming into contact with the outer surface of the door glass at the time the door glass is fully closed;

a vertically extending end line of said seal lip of said corner member forming a straight line coinciding with an end line of said seal lip of said vertical member, which is in the state pushed outwards by the outer surface of the door glass, at the time the door glass is fully closed;

a seal lip of a connecting portion of said vertical member and said corner member having a cross section gradually changing from the cross section of said seal lip of said vertical member in the free state, to the cross section of said seal lip of said corner member.

2. A door glass run according to claim 1, wherein said vertical member and said upper member are an extruded member, respectively, and said corner member is a molded member obtained by connecting said end of said vertical member to said end of said upper member within a metal mold.

3. A door glass run according to claim 2, wherein the cross section of each of said seal lip of said end of said vertical member, and said seal lip of said end of said corner member is equal to that of said seal lip of said vertical member, which is in the state pushed outwards by the door glass, said connecting portion is provided in said vertical member in the vicinity of said end, and the cross section of said seal lip of said conecting portion is gradually changed downwards from said cross section of said seal lip of said end to that of said seal lip in the free state.

4. A door glass run according to claim 2, wherein the cross section of each of said seal lip of said end of said vertical member and said seal lip of said end of said corner member is equal to that of said seal lip of said vertical member in the free state, said connecting portion is provided in said corner member in the vicinity of said end, and the cross section of said seal lip of said connecting portion is gradually changed upwards from the cross section of said seal lip of said end to the cross section equal to that of said seal lip of said vertical member, which is in the state pushed outwards by the door glass.

* * * * *